C. L. HEISLER.
LOCOMOTIVE ENGINE.
APPLICATION FILED MAR. 20, 1912.
1,038,577.
Patented Sept. 17, 1912.
2 SHEETS—SHEET 2.
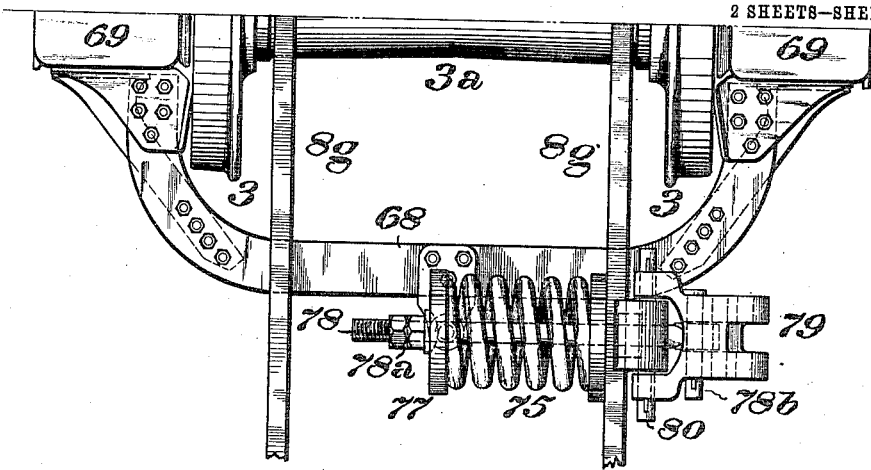
-FIG. 3.-
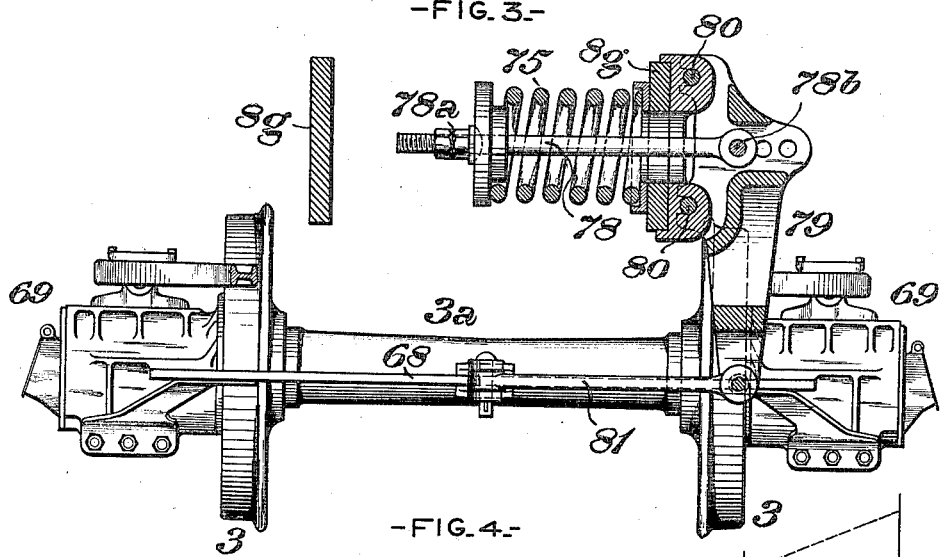
-FIG. 4.-
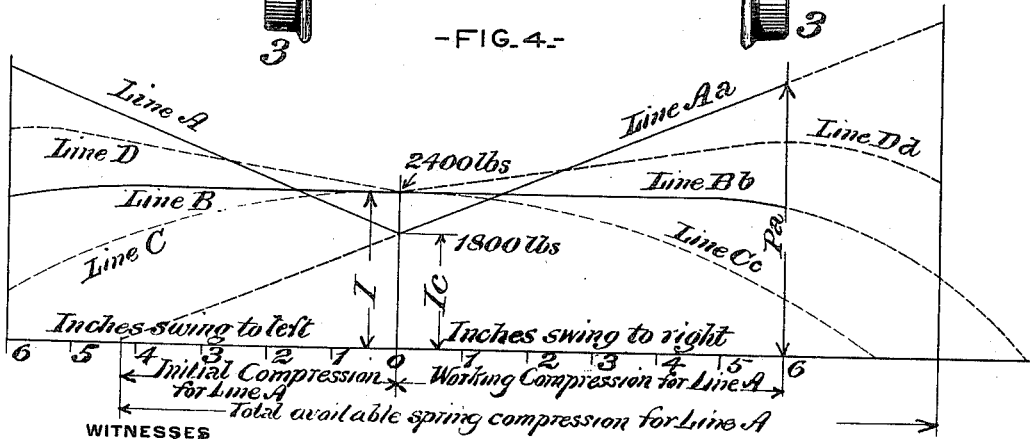
-FIG. 7.-
WITNESSES
INVENTOR

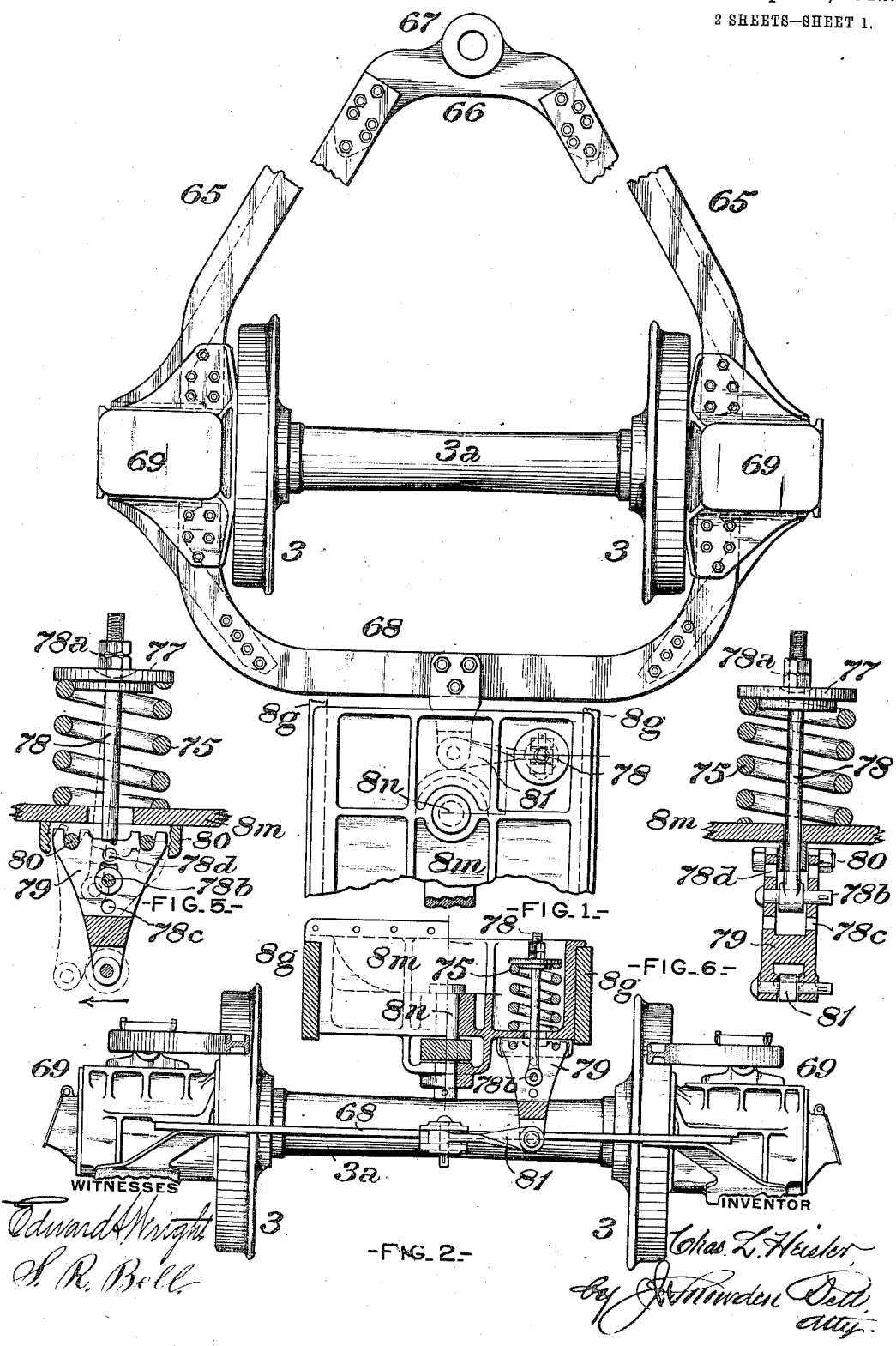

UNITED STATES PATENT OFFICE.

CHARLES L. HEISLER, OF SCHENECTADY, NEW YORK.

LOCOMOTIVE-ENGINE.

1,038,577. Specification of Letters Patent. Patented Sept. 17, 1912.

Application filed March 20, 1912. Serial No. 685,025.

*To all whom it may concern:*

Be it known that I, CHARLES L. HEISLER, of Schenectady, in the county of Schenectady and State of New York, have invented a certain new and useful Improvement in Locomotive-Engines, of which improvement the following is a specification.

My invention particularly relates to means for regulating and controlling the movements of the trailing truck of a locomotive engine, relatively to the main frame thereof, and its object is to provide a centering device for locomotive trailing trucks which shall be of simple and inexpensive construction and readily applicable in trailing trucks of the various designs now applied in service; which will present great steadying power on comparatively straight track and offer the minimum resistance to the proper movement of the locomotive in taking and passing curves; and by means of which a predetermined elastic resistance to the lateral traverse of the truck, when moving from its normal or mid position, may be instituted, and be maintained as constant, or increased or diminished, accordingly as the conditions of service may indicate to be desirable.

The improvement claimed is hereinafter fully set forth.

In the accompanying drawings: Figure 1 is a plan or top view of a locomotive engine trailing truck, illustrating an application of my invention; Fig. 2, an end view, partly in section, of the same, as seen from the rear; Fig. 3, a partial plan view, illustrating a modification of structural detail; Fig. 4, an end view, partly in section, of the same; Fig. 5, a vertical central section, on an enlarged scale, through the centering device, detached; Fig. 6, a similar section, taken at right angles to Fig. 5; and, Fig. 7, a diagram illustrating the resistances available in the operation of the centering device.

My invention is herein exemplified as applied in a locomotive engine trailing truck of the two wheeled radial type, which is of one of the approved constructions of present standard practice, and which, as it does not, in and of itself, form part of my present invention, will not be herein fully and at length described.

The truck frame is substantially triangular in plan and comprises two forwardly and inwardly inclined radius arms, 65, a connecting plate, 66, provided with a socket, 67, for a center pin by which the truck is coupled to the main frame of the locomotive, a rear transverse member, 68, and two journal box castings, 69, forming parts of the sides of the frame. The truck is supported on a pair of wheels, 3, secured upon an axle, $3^a$, which rotates in bearings on the axle box castings, 69. The rear sections of the main engine frame members, $8^g$, which extend in rear of the truck are, as usual, of "slab" form, and are connected by a bumper casting, $8^m$, which carries the draw bar coupling pin, $8^n$, in the ordinary manner, and which acts in resisting strain imposed upon the main frame, as a part of said frame.

Referring first to Figs. 1, 2, 5 and 6, in the practice of my invention, I provide a helical centering spring, 75, which abuts, at its lower end, on the bumper casting, $8^m$, and at its upper end, on a cap plate, 77, fitting freely on a vertical floating rod, 78, and held in position thereon, against the resistance of the centering spring, by adjusting nuts, $78^a$, engaging a thread on the rod, 78, the nut adjacent to the cap plate having a spherical face, fitting a corresponding recess in the plate. The resistance of the centering spring, 75, instead of being transmitted in direct line to the truck, as in the case of the direct acting buffer springs of prior and present practice, is, under my invention, applied to the truck through the intermediation of a pivoted lever mechanism, whereby the resistance may be maintained substantially constant or be increased or reduced by variations of leverage as desired. As herein exemplified, the lever mechanism referred to is of the following construction. The lower end of the floating rod is coupled, by a pin, $78^b$, to a lever in the form of a swing beam, 79, which is a double plate casting, of triangular shape, having semicircular recesses in its top, on opposite sides of its central plane, which is normally in line with the axis of the floating rod, said recesses fitting bearing pins, 80, fixed in the bottom of the bumper casting, $8^m$. One or the other of said bearing pins, as the case may be, forms the fulcrum of the swing beam when deflected from normal position by the lateral movement of the truck, as indicated in dotted lines in Fig. 5. The lower end of the swing beam, 79, is coupled, by a link, 81, to the rear member of the truck frame, or, equivalently, the spring may act against the lateral movements of the truck through the intermediation of a roller. The leverage of the swing beam may be increased or decreased as desired, by making the connection of the floating rod, 78, to it, either below or above the position shown in Figs. 5 and 6 respectively, holes, 78$^c$ and 78$^d$, for the reception of the coupling pin, 78$^b$, being provided for that purpose.

Figs. 3 and 4 illustrate a modification of structural detail of the appliance, the essential elements and operation of which are similar in all particulars to that of the construction above described, the centering spring and floating rod being, in this case, disposed horizontally instead of vertically, and the swing beam consequently being in the form of an elbow lever. As indicated by the dotted lines in Fig. 5, when the pull of the truck, due to its lateral movement, is in the direction of the arrow, the swing beam, 79, is moved thereby, through the link, 81, about the bearing pin, 80, on its left hand side, as a fulcrum, and is released from the bearing pin on its right hand side. This movement of the swing beam draws down the floating rod, 78, against the resistance of the centering spring, 75, which is preliminarily adjusted to a desired and determined initial tension by the nuts, 78$^a$. This initial tension may be, say, 2400 pounds, as indicated in Fig. 7, at the intersection of the curves, B, C, and D, with the perpendicular line at the zero mark. If the floating rod is coupled to the swing beam through the upper holes, 78$^d$, then the upper lever arm, i. e., the distance between the axes of the left hand bearing pin, 80, and the coupling pin, 78$^b$, will remain practically constant; the resistance of the centering spring will increase directly with the movement of the swing beam to the left; and the resistance diagram will be indicated by the line A, Fig. 7, the initial spring tension being indicated by the vertical line I$^c$. If, however, the floating rod and swing beam be connected through the lower holes, 78$^c$, then as the swing beam moves to the left, its lower end will move comparatively rapidly in that direction, and consequently effect a proportionately rapid decrease of the length of the upper lever arm. As a result, the increase in spring compression or resistance is not so rapid, while the pull toward the left, exerted by the movement of the truck, acts with a rapidly increasing leverage against the resistance of the spring, owing to the decrease of leverage by decrease of the upper lever arm length. The net resistance at the lower end of the swing beam will, therefore, be reduced below the initial tension, as indicated by the line C. The conditions above recited will, of course, similarly obtain upon the movement of the truck, in the opposite direction, i. e., to the right, as indicated by the lines A$^a$, B$^b$, C$^c$, D$^d$, Fig. 7.

The primary object of my invention is, as before stated in substance, to provide, in a centering appliance, a simple means of adjustment, whereby variable resistance to the lateral movement of a locomotive engine trailing truck, as indicated in the diagram Fig. 7, may be prevented as desired. The inclined lines A and A$^a$ of this diagram, which illustrate the result of the ordinary construction of direct acting buffer centering springs, intersect the perpendicular at a point corresponding to an initial resistance of 1800 pounds, and the vertical ordinate P$^a$, erected perpendicular to the base line at a point corresponding to a swing of the truck of 6 inches to the right, shows the increase of spring resistance, relative to truck movement, as the truck leaves the mid position, when no means are provided between the truck and spring to modify the nature and result of the application of forces. The dotted portion of the line A$^a$ to the left of the perpendicular line at zero, indicates the initial tension of the spring as installed, and the dotted portion at the right indicates the extent that the spring may be compressed before coming together solid, after the truck swings 6 inches to the right, at which point the spring resistance is more than doubled. This increase of resistance is substantially objectionable in the trailing truck of a locomotive operating in passenger or other road service, in which the locomotive is, for practically all the time, moving forward, and in the small proportion of its mileage in which it moves backward, it does so at slow speed. A trailing truck spring centering device which increases its resistance to truck swing on curves, naturally retards or neutralizes the action of the leading truck in guiding the locomotive around curves. Furthermore, in road service, particularly at high speed, it is specially desirable that the trailing truck should resist the tendency to "nose", or swing from side to side on a comparatively straight track, and consequently the initial resistance to swing should be at its maximum when the trailing truck is at its mid or neutral position, as indicated by the lines C and C$^c$.

Under certain conditions, it may be desirable that the resistance should remain practically constant for all positions of the truck, as indicated by the line B and B$^b$, and under other conditions, it may be preferable that the resistance should be similar to that given by a direct acting buffer spring, as indicated by the lines A, A$^a$, or D, D$^d$. The lines B, B$^b$, of the diagram illustrate the action when the floating rod and swing beam are coupled as shown in full lines in the drawings. In this case, the resistance is constant, as the increase in leverage is practically equal to the increase in spring resistance.

In addition to the advantages attained by the application of my invention, in the particulars of simplicity, economy, adaptability to ordinary truck constructions without modification thereof, and capability of adjustment of centering spring resistance, it will be noted that a much less degree of compression of the spring is required than in the case of the direct connected buffer springs ordinarily applied in practice, and therefore that the life of the spring is materially increased, and the necessity of frequent adjustments or renewals avoided

I claim as my invention and desire to secure by Letters Patent:—

1. In a locomotive engine, the combination of a main frame, a supporting truck connected thereto, and a centering mechanism interposed between the main frame and truck and comprising a centering spring bearing on the main frame and a pivoted lever mechanism through which the resistance of said spring acts upon the main frame and truck, and means for varying the leverage of said lever mechanism.

2. In a locomotive engine, the combination of a main frame, a supporting truck connected thereto, a centering spring bearing on the main frame, and a pivoted lever mechanism through which the resistance of the centering spring is transmitted to the truck, in direction to resist lateral movement thereof relatively to the main frame.

3. In a locomotive engine, the combination of a main frame, a supporting truck connected thereto, a centering spring bearing on the main frame, a pivoted lever mechanism through which the resistance of the centering spring is transmitted to the truck, and means for varying the leverage of said lever mechanism.

4. In a locomotive engine, the combination of a main frame, a supporting truck connected thereto, a centering spring attached to and bearing on the main frame, a lever pivoted on the main frame, and operatively connected with the truck, and means for transmitting the resistance of the centering spring to said lever.

5. In a locomotive engine, the combination of a main frame, a supporting truck connected thereto, a centering spring bearing on the main frame, a lever coupled centrally to the centering spring and pivoted laterally on the main frame, and an operative connection between said lever and the truck.

6. In a locomotive engine, the combination of a main frame, a supporting truck connected thereto, a centering mechanism interposed between the main frame and truck and comprising a centering spring, a pivoted lever mechanism through which the resistance of said spring acts upon the main frame, and means for coupling the centering spring to said lever mechanism, at different determined distances from the pivot thereof, and an operative connection between said lever mechanism and the truck.

7. In a locomotive engine, the combination of a main frame, a supporting truck connected thereto, a centering spring bearing at one end on the main frame, an adjustable cap plate abutting on the opposite end of the centering spring, a lever pivoted on the main frame, out of the axial line of said spring, a rod coupling said lever with the cap plate, in the axial line of said spring, and an operative connection between said lever and the truck.

8. In a locomotive engine, the combination of a main frame, a supporting truck connected thereto, a centering mechanism interposed between the main frame and truck and comprising a centering spring bearing at one end on the main frame, pivots fixed in the main frame on opposite sides of the axial line of the centering spring, a lever fitted to swing on either of said pivots independently of the other and having a plurality of pivot holes normally in the axial line of the centering spring, a rod connecting said lever with a pivot fitting one of the pivot holes of the lever, and an operative connection between said lever and the truck.

CHARLES L. HEISLER.

Witnesses:
Thos. H. Ainsworth,
Carl C. Ritter.